June 19, 1934.   C. W. LAMBERT   1,963,664
AUTOMATIC VARIABLE PITCH PROPELLER
Filed May 24, 1933   6 Sheets-Sheet 3
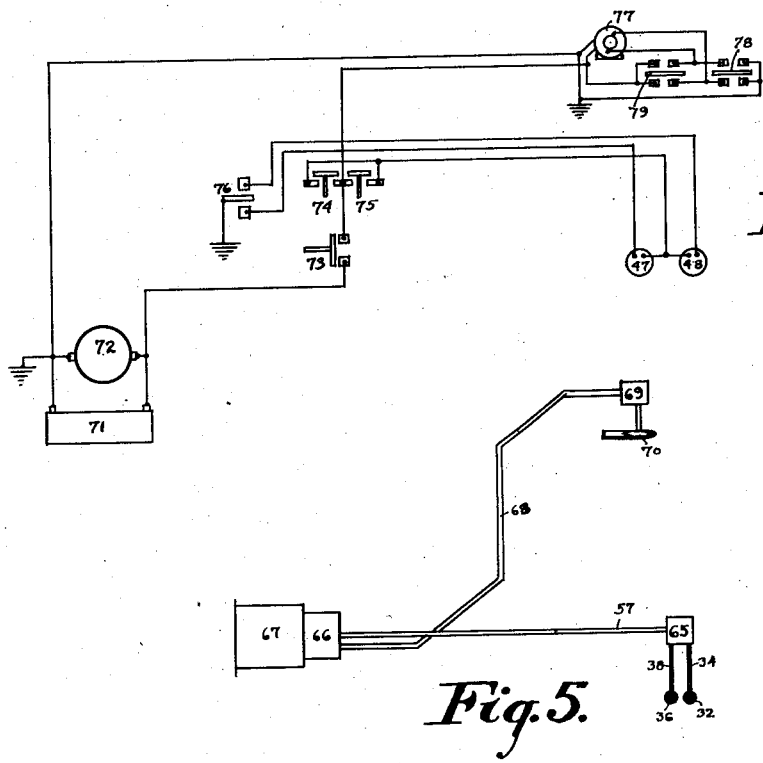
Fig.6.
Fig.5.
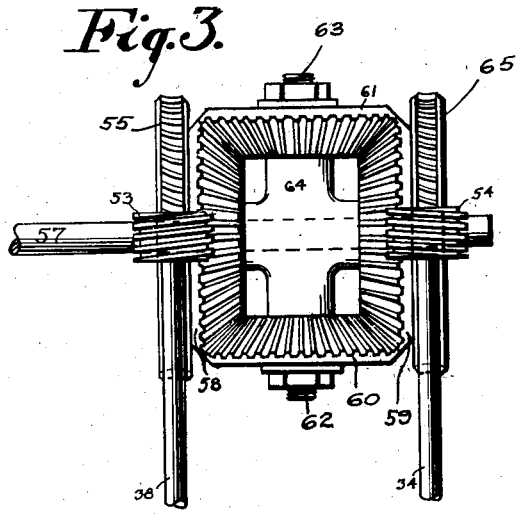
Fig.3.
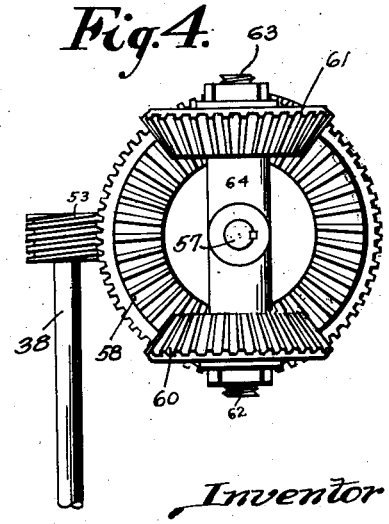
Fig.4.
Inventor
Chandley W. Lambert.

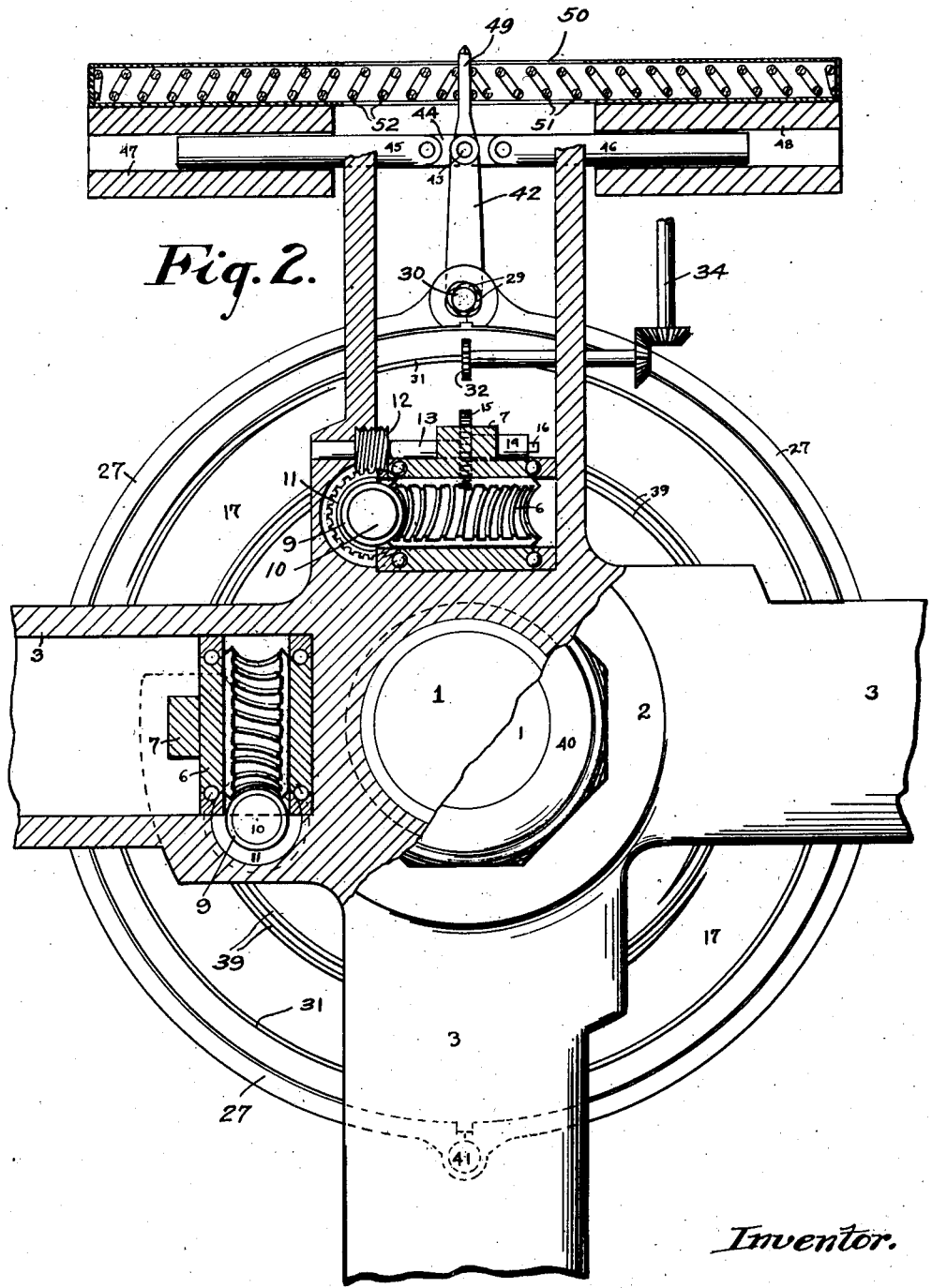

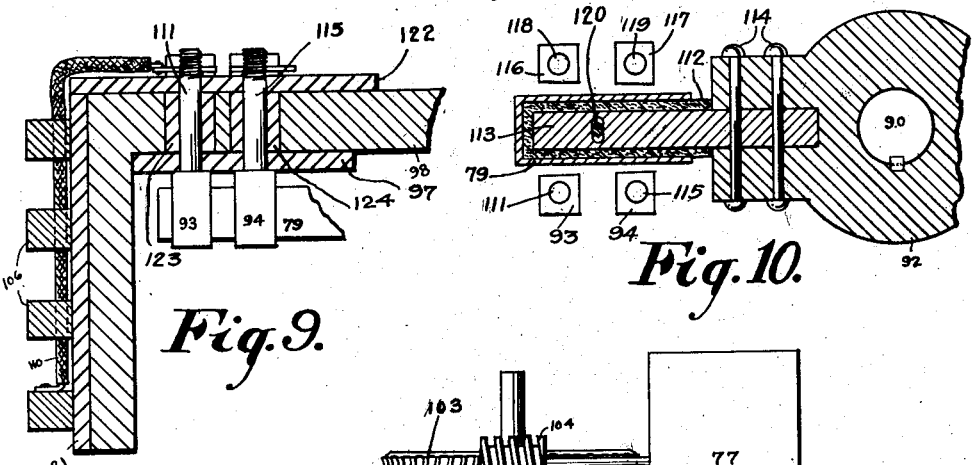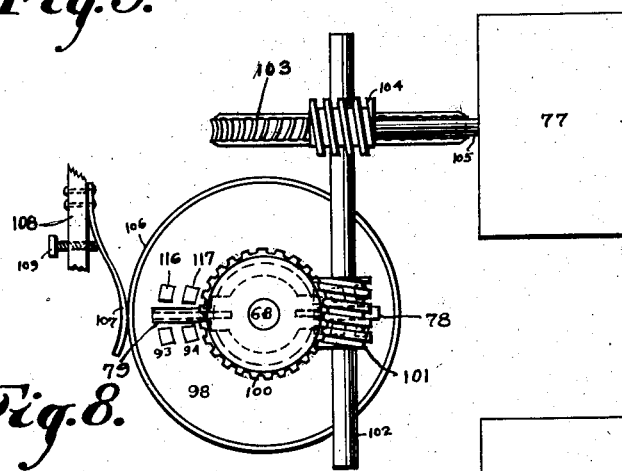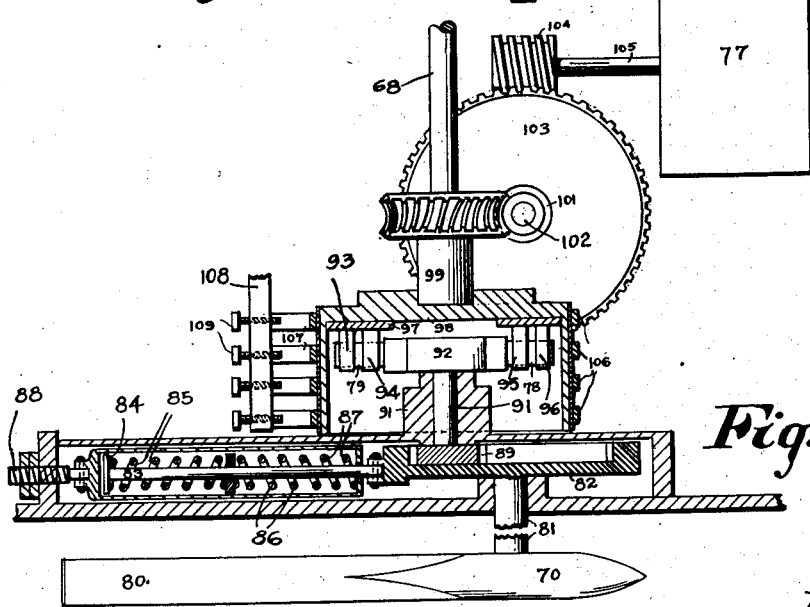

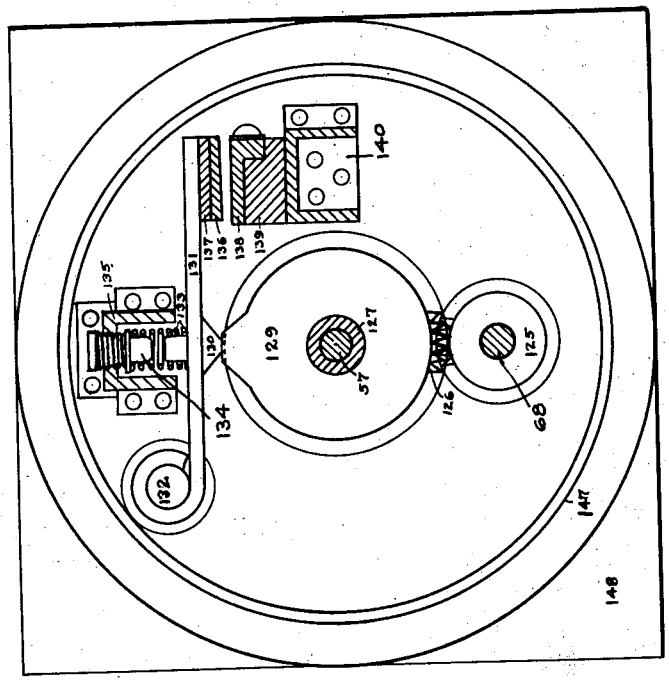
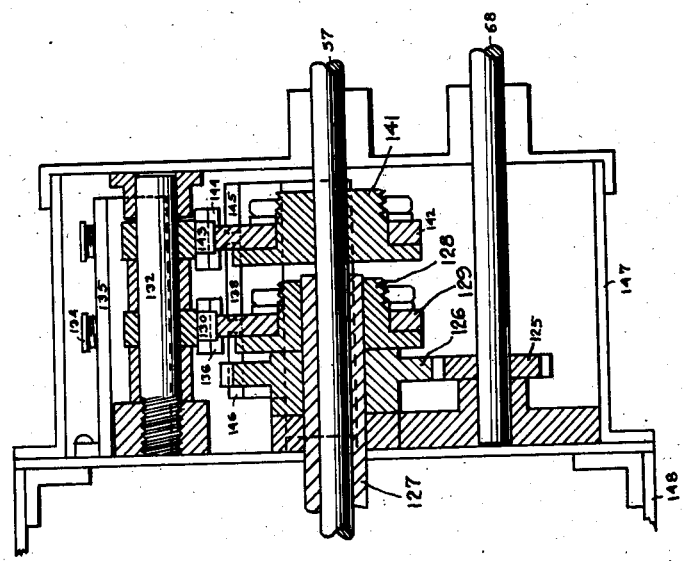

June 19, 1934. C. W. LAMBERT 1,963,664
AUTOMATIC VARIABLE PITCH PROPELLER
Filed May 24, 1933 6 Sheets-Sheet 6

Inventor
Chandley W. Lambert.

Patented June 19, 1934

1,963,664

UNITED STATES PATENT OFFICE 1,963,664

AUTOMATIC VARIABLE PITCH PROPELLER

Chandley W. Lambert, Cleveland, Ohio

Application May 24, 1933, Serial No. 672,632

5 Claims. (Cl. 170—162)

The invention relates to automatic variable pitch propellers, in which the angular pitch of the blades is changed or varied by engine power, automatically controlled, relatively to changes of air-speed of the airplane; and is an improvement of former application, Serial No. 670,521.

Figure 1:
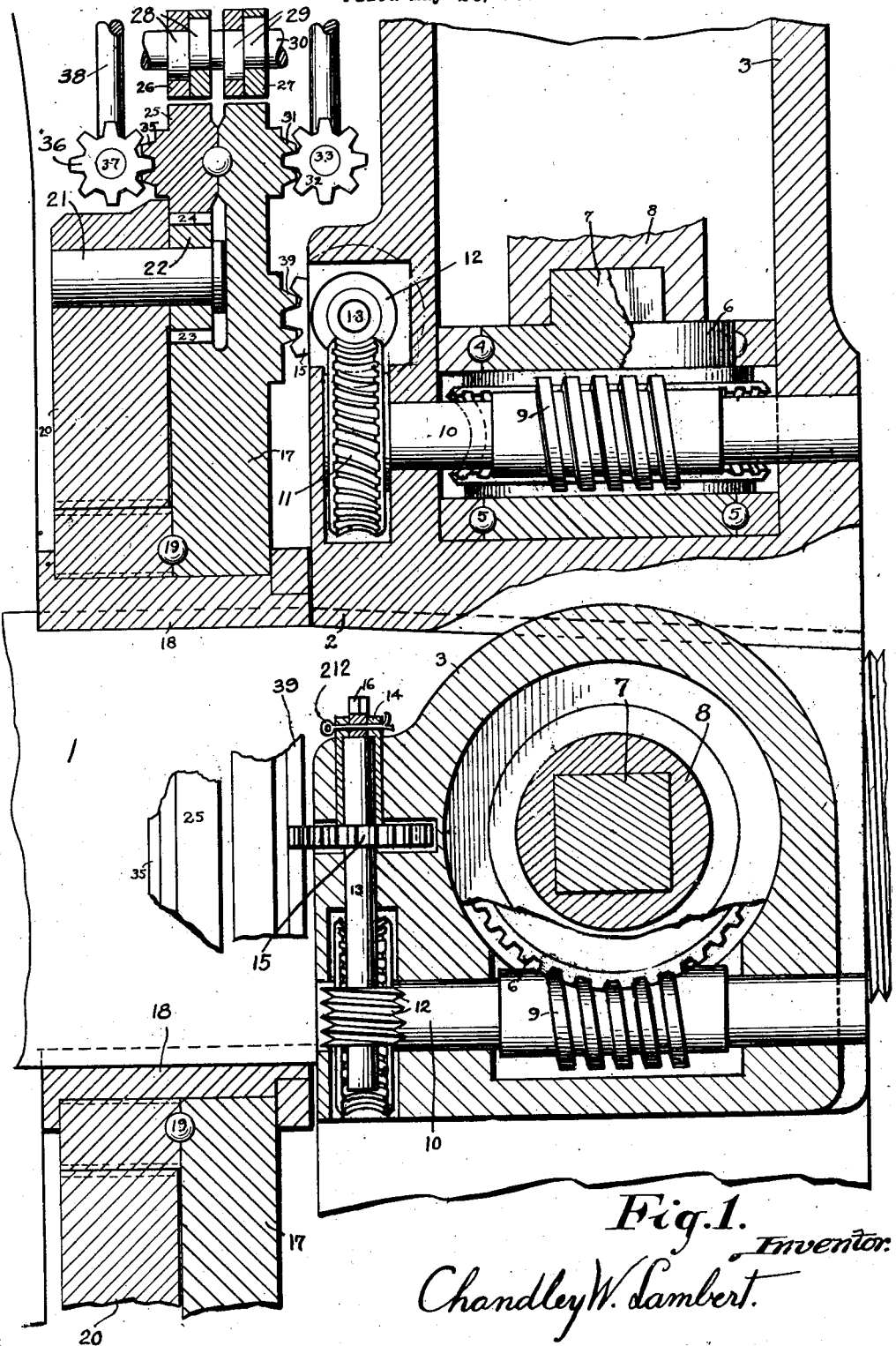
Figures 13, 14:
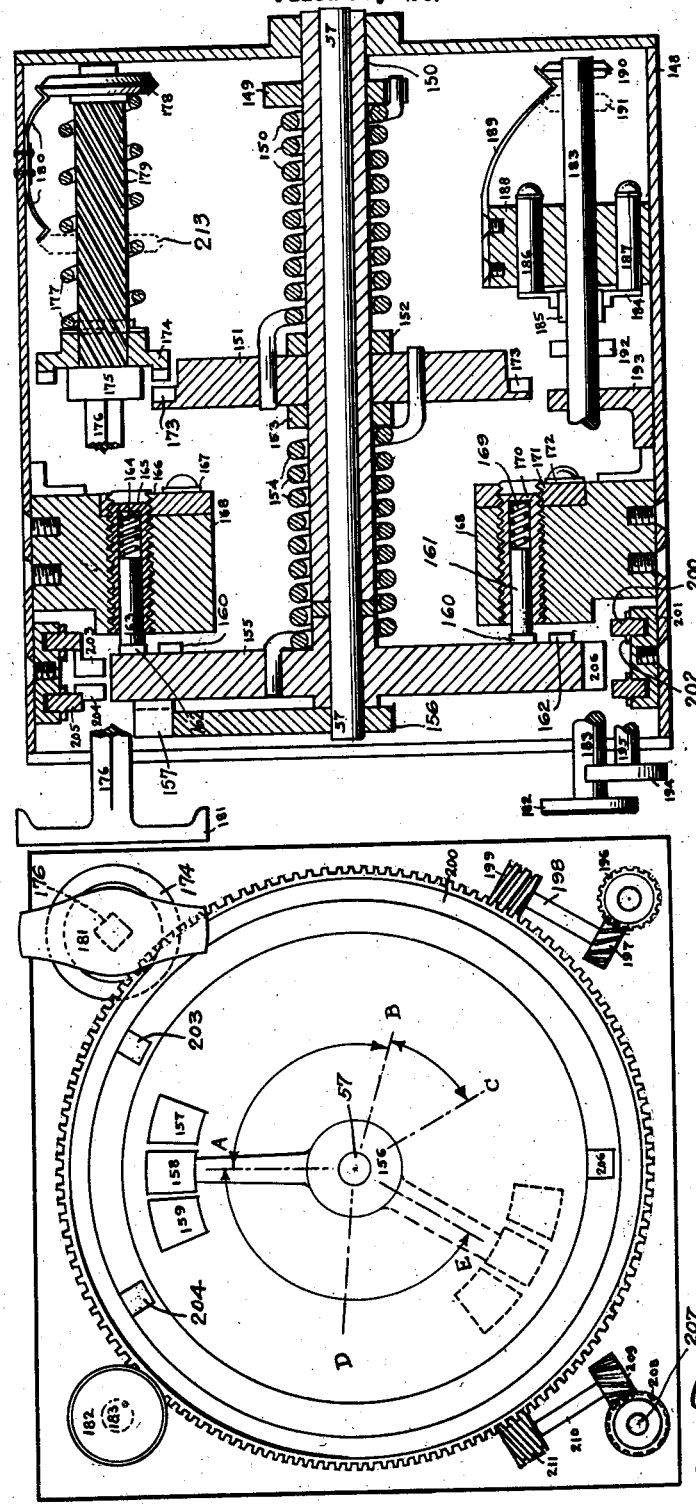

In the drawings, Fig. 1 is a vertical section on a longitudinal plane through the propeller shaft. A four bladed propeller is shown in the drawings because a plan view of the gearing of one blade is an elevation of the similar adjacent blade. Fig. 2 is a transverse elevation partly in section, of the propeller blades, hub, and shaft. Fig. 3 is a side elevation and Fig. 4 an end elevation of the differential gear which is part of the control system. Fig. 5 is a simplified diagram of the mechanical parts and their related connection to each other in the control system. Fig. 6 is a simplified diagram of the electrical control circuit. Fig. 7 is an elevation and Fig. 8 a plan, in section, of the air-speed follow-up system. Figs. 9 and 10 are details in section of parts of the follow-up system of Figs. 7 and 8. Figs. 11 and 12 are side and end elevations in section of the economizer switches, which are attached to the end of the automatic control switch case of Fig. 14. Fig. 13 is a front elevation and Fig. 14 a side elevation in section of the automatic control switch.

Similar parts are numbered the same in all figures of the drawings.

In Fig. 1, 1 is the propeller shaft, 2 is a hub secured to shaft 1. 3 is a hub barrel in which a variable pitch blade may be secured. A blade of the type shown in my application Serial No. 613,220 being preferred. In hub barrel 3 are annular ball bearings 4 and 5 for shank gear 6 on which is square or splined pin 7 which cooperates with blade shank 8.

With gear 6 meshes worm gear 9 on shaft 10, on which is gear 11 meshing with worm gear 12 on shaft 13, on which loose collar 14,—to which is secured star wheel 15,— is secured to an extension 16 of shaft 13 by pin 212. Loose collar 14 forms an easy means for adjusting a blade individually, by removing pin 212 and turning shaft extension 16 with a wrench.

Annular plate or brake wheel 17 is loose on collar 18 which is secured to shaft 1. Wheel 17 is backed up by annular thrust bearing 19. To collar 18 are secured spaced radial arms 20 in which are short studs or shafts 21 on which spaced gears 22, mesh with exterior teeth 23 on brake wheel 17 and interior teeth 24 of ring gear 25. Brake shoes 26 and 27, actuated by cams 28—28 and 29—29 on shaft 30, cooperate with brake ring 25 and wheel 17. On wheel 17 is spiral tooth 31 meshing with star wheel 32 on shaft 33, which by bevel gears or universal joints turns shaft 34. Similarly on brake ring gear 25 is spiral tooth 35 meshing with star wheel 36 on shaft 37 which similarly actuates shaft 38. Shafts 34 and 38 turn slowly at the same speed while shaft 1 is revolving, and providing that brake shoes 26 or 27 are not engaging the braking surfaces of wheel 17 or ring gear 25.

On the side of wheel 17 is spiral tooth 39 which meshes with star wheels 15—15. In the form shown there is one of these star wheels and its attendant train of gears for each blade of the propeller.

In Fig. 2, hub 2 is secured to shaft 1 by nut 40. Pin 41 secured to the engine crank case, forms a pivot for the brake shoes 26 and 27 of Fig. 1. To shaft 30 is secured brake lever arm 42 which is actuated by pin 43, links 44, iron solenoids 45 and 46, in electrical coils 47 and 48. Extension 49 of arm 42 operates in closed slot 50 of the case enclosing brake release compression springs 51 and 52. Movement of arm 42, from the center position as shown, and rotation of shaft 30 in one direction, sets the brake shoes 26 on brake ring 25. Movement in the opposite direction from center, sets the brake shoes 27 on wheel 17. In the center position, as shown in Figs. 1 and 2, neither brake is applied, and ring gear 25 and wheel 17 revolve together at shaft speed, and there is no relative motion between spiral 39 and star wheels 15—15, and the blade pitch does not change.

In Figs. 3 and 4, shaft 38 has secured to it worm gear 53, which meshes with gear 55 to which bevel gear 58 is secured. Both are loose on shaft 57. Similarly shaft 34 turns worm gear 54, which meshes with gear 56 to which bevel gear 59 is secured. These are likewise loose on shaft 57. Gears 58 and 59 mesh with gears 60 and 61 which are loose on pins 62 and 63, which are secured to the center support 64 which is secured to shaft 57. Normally, when no change of pitch is occurring, gears 58 and 59 turn slowly at the same speed in opposite directions, and the shaft 57 stands still. The rotation of shaft 57 is a measure of the change of pitch of the blades.

In Fig. 5, 32 and 36 are small star wheels of Figs. 1 and 2, which actuate the vertical shafts 34 and 38 to differential gear 65, shown in Figs. 3 and 4. Flexible rocking shaft 57 leads to economizer switch 66 and automatic control switch 67, Figs. 11 to 14, which are also connected by flexible shaft 68 to follow up system 69 and air speed vane 70.

In Fig. 6, 71 is an electrical storage battery, 72 an electrical generator, 73 main cut-out switch for pitch control, 74 and 75 are economizer switches, 76 an automatic control selective switch. 77 a small shunt wound direct current motor to operate the follow-up system, 78 and 79 are contactors of motor cutout and reversing switch. When 78 connects or closes the upper contacts, 79 closes the lower contacts, and vice versa. 47 and 48 are the brake operating coils of Fig. 2.

In Fig. 7, 70 is the air vane which at zero air speed stands transversely of the ship, pointing at right angles to the direction of flight. As the speed increases, the air stream acting on the blade or tail 80, turns the vane more and more toward a position parallel to the line of flight, a position which it attains only at maximum air speed.

Vane 70 is attached to shaft 81, to which is secured internal gear 82 to which is pivoted pull rod 83 and stop 84 which acts against compression springs 85 and 86 contained in case 87 which is pivoted to adjusting screw 88. Meshing with gear 82 is gear 89 on shaft 90 in bearing 91. To shaft 90 is secured insulating collar 92 to which are secured electrical contactors 78 and 79 which may contact contacts 95—96 and 93—94 respectively. 97 is an insulating ring (Figs. 9 and 10) secured to drum 98 on shaft 99 to which is secured gear 100 and shaft 68. Gear 100 meshes with worm 101 (Figs. 7 and 8) on shaft 102 on which is secured gear 103 meshing with worm 104 on motor armature shaft 105 of follow-up shunt motor 77.

106—106 are electrical collector rings, insulated from drum 98 by insulator 121 (Fig. 9), which rings are contacted by spring brushes 107—107 mounted on insulating holder 108, each brush having a contact adjustment by screw 109.

In Fig. 9, the lower collector ring, as an example, is shown connected by insulated wire 110 to terminal post 111 of contact 93 which is insulated from drum 98 by insulating bushing 123 and insulating rings 97 and 122.

In Fig. 10, insulating collar 92 is secured to shaft 90. To collar 92 is secured switch arm 113 by pins 114—114. Pin 120 extending through a closed slot in arm 113 is secured to contactor 79 which may close the circuit through contacts 93—94 or contacts 116—117. A light springy substance, as sponge rubber, is shown at 112 between contactor 79 and arm 113, to allow 79 to contact both contacts 93 and 94, with equal pressure on each.

In Figs. 11 and 12 shaft 57 of Fig. 3 and shaft 68 of Fig. 7, enter economizer switch case 147. On shaft 68 is secured gear 125 meshing with gear 126 secured to sleeve 127 which is loose on shaft 57. Collar 128 is secured to sleeve 127. Cam 129 is adjustably secured to collar 128. Cam 129 contacts follower 130 on switch arm 131 pivoted on shaft 132.

Compression spring 133 on adjustable pin 134 in bracket 135 bears against arm 131 tending to bring contactor 136 (insulated at 137 from arm 131) against contacts 138 and 146 secured to insulating bushing 139 secured to bracket 140.

Collar 141 is secured to shaft 57 and carries adjustable cam 142 which contacts follower 143 which operates contactor 144 on or off from contacts 145—138. These contactors form economizer switches which, being connected in parallel, open the control circuit when both cams 129 and 142 raise their followers 130 and 143 at the same time, as later explained.

Shaft 57 and loose sleeve 126 enter the automatic selective control switch case 148. On the end of shaft 57 is secured switch arm 156, Figs. 13 and 14, and secured to sleeve 127 is fixed collar 149 holding one end of torsional spring 150, the other end being secured to loose gear plate 151, between thrust collars 152 and 153 which are secured to sleeve 127. One end of torsional spring 154 is secured to plate 151 and the other to insulating switch plate 155 which is loose on shaft 57 between loose sleeve 127 and fixed switch arm 156 which carries contactor 158 which may contact electrical contact 157, for decreasing the propeller blade pitch, or contact 159 for increasing the blade pitch. Contacts 157 and 159 are connected electrically to slip rings 160 and 162 against which brushes 161 and 163 are held respectively by compression springs 169 and 164 in brush holders 170 and 165 which contact terminals 171 and 166 which are secured to annular insulating brush holder 168.

To terminals 166 and 171 are secured conductors, at 167 and 172, from brake coils 47 and 48 shown in Figs. 2 and 6.

On plate 151 are radial teeth 173 which may be engaged by gear 174 which is on push-pull rod 176 between stop 175 and compression spring 177 which bears against gear 174 and beveled stop 178 which contacts double end stop spring 180 when at the limits of its travel, at positions 178 or 213. On rod 176 are spiral teeth 179 which mesh with similar interior threads in gear 174. Square rod 176 cannot turn, so pulling out on pitch reversing handle 181 first engages gear 174 with teeth 173 and then threads 179 revolve gear 174 and plate 151, compressing spring 177 and tending to revolve plate 155 through torsional spring 154, so that contact 157 is held against contactor 158, decreasing the pitch of the propeller blades or turning them into a position of negative or reverse pitch.

Handle 182 and rod 183 carry contactor 184 insulated at 185, which contactor may contact electrical contacts 186 and 187 which are secured to insulating bracket 188 to which is secured spring 189 which engages stop 190 at the "on" position, or the "off" position at 191.

Stop 192 on rod 183 contacts limiting stop 193 in the switch "off" position. This cut-out switch, shown at 73 Fig. 6, is manually operated. Although located in the upper left corner in Fig. 13, the cut-out switch is shown at the bottom of Fig. 14 merely to avoid confusion with other parts of the drawings.

Hand wheel 194 Fig. 14 is secured to shaft 195 on which, Fig. 13, is spiral bevel gear 196 meshing with spiral bevel gear 197 on shaft 198 placed tangentially to ring gear 200 with which worm gear 199 on shaft 198 meshes. Ring gear 200 revolves in spaced slotted guides 201, against which shoulders 202 on the ring gear 200 make sliding contact. A stop 203 is secured to ring gear 200 and a similar stop 204 is secured to ring 205. These stops form adjustable limiting stops against which stop 206 of plate 155 may hit at the extremes of movement of the switch plate corresponding to maximum reverse pitch and maximum forward pitch. A shaft 207 operates gears 208 and 209 and shaft 210 and worm 211 and ring gear 205 for the purpose of adjusting the position of stop 204.

The ratio of the gearing which drives shaft 57 from star wheels 32 and 36, Figs. 1, 2, and 5, is such that shaft 57 and contactor 158 revolve through arc AB, Fig. 13, while the blades change from low forward pitch to cruising speed pitch. At position B cam 142, Fig. 11, raises contactor 144 and at the corresponding cruising air speed cam 129 raises contactor 136. Since these switches are connected in parallel, as shown at 74 and 75 Fig. 6, the apparatus is cut out with resulting economy of electrical energy, until an appreciable increase or decrease of air speed again allows contactor 136 to close the control circuit.

Position C, Fig. 13, is attained only at maximum air speed and maximum pitch. When a reverse or negative pitch is desired, handle 181 is pulled out and the plate 155 tends to revolve toward position E—low negative pitch—and contactor 158 follows the movement.

The point of attachment of rod 83 to gear 82, Fig. 7, and the adjustable pressure on springs 85—86 are such that at zero air speed the plate 155 and contacts 157—159 tend to take position A, Fig. 13, which corresponds to low forward pitch of the propeller blades, and position C at maximum air speed and blade pitch.

The time required for change of blade pitch from A to C or C to A is approximately 8 seconds, which compares favorably with the time required to accelerate or decelerate the plane from zero air speed to maximum air speed, or vice versa, during strenuous, even abnormal, flying conditions. The blade pitch closely follows any appreciable change of air speed under all conditions.

The selective control switch Fig. 13, which is mounted in the instrument panel, is provided with a transparent cover and the position of switch arm 156 and contactor 158 is a visual indicator of blade pitch.

With the engine running and plane ready to take off, switch handle 182 pushed forward to close the control circuit, blades in position of low forward pitch indicated by position A, Fig. 13, then, as the airplane gains speed, the air stream acting on air vane 80 turns the shaft 81, Fig. 7, compressing spring 85—86 and causing contactor 79, Fig. 10, to touch contacts 116 and 117 and contactor 78 to touch contacts 95—96, Fig. 7, which causes motor 77 to turn in a direction to cause shaft 68 to turn in the same direction as shaft 90, i. e., to follow-up the movement of vane 80. This soon opens the contacts of the reversing switch and the motor stops.

In the meantime rotation of shaft 68 is transmitted to sleeve 127, Fig. 11, and through torsional springs 150 and 154, Fig. 14, to switch plate 155. Contact 159 touches contactor 158, closing the circuit through coil 48, Figs. 2, and 6, pulling plunger 46 to the right, compressing spring 51, setting brake 27 on wheel 17, which is slowed down. There is now a relative movement between star wheels 15 and spiral 39, which is transmitted through the hub reduction gears to the blades, increasing the pitch. Simultaneously with the slowing down of wheel 17, ring gear 25 is correspondingly accelerated. Now gears 60 and 61, Fig. 3, roll around on gear 56, turning shaft 57 in the same direction, Fig. 13, as plate 155 was moved, as described above, tending to follow up and finally to open the contact 158—159. When this occurs, coil 48, Figs. 2 and 6, is de-energized and spring 51 releases the brake from wheel 17, which immediately comes up to shaft speed, gear 25 drops to shaft speed, and change of pitch stops. Equilibrium in the control circuit is restored. Further increase of speed causes a continuation, or repetition, of the process.

Decrease of air speed allows spring 85—86 to turn gear 82 and shaft 90, Fig. 7, in the opposite direction. Contactor 79 touches contacts 93—94 and contactor 78 touches its opposite contacts. Motor 77 is reversed and again causes shaft 68 to turn in the same direction as shaft 90 and again tending to open the contacts. Contact 157, Fig. 13, touches contactor 158, energizing brake coil 47 which pulls solenoid 45 to the left, compressing spring 52 and applying brake 26 to ring gear 25, Fig. 1, which is retarded. Wheel 17 is accelerated above shaft speed. Again there is relative movement between spiral 39 and wheels 15, but in the opposite direction. The gears in the hub lower the blade pitch. Similarly shaft 57, Fig. 3, is revolved but in the reverse direction, which action causes contactor 158 to move away from contact 157 and eventually open the circuit, releasing the brake. The pitch has been decreased proportionately as the air speed was decreased, these changes taking place almost simultaneously.

I claim:—

1. An air-speed measuring means, means for transmitting appreciable changes of air speed co-operating with said measuring means, rotatable propeller blades, a hub cooperating with said blades, means for rotating said blades in reverse directions relatively to said hub, differential measuring means cooperating with said rotating means, control means cooperating with said differential measuring means and said rotating means and said air-speed transmitting means.

2. An air speed measuring means, air speed transmitting means comprising reversible motor driven gears, flexible shaft, and reversing switch, cooperating with said measuring means, differential measuring means cooperating with variable pitch propellers for transmitting, in reverse directions, motion relatively to changes of propeller pitch, electrical control means cooperating with said flexible shaft and said differential measuring means, economizer switches cooperating with said flexible shaft and said differential measuring means.

3. In combination, a power shaft, a propeller hub, spaced rotatable propeller blades, propeller pitch changing gears, reversible pitch changing means comprising controlled engine power applied in reverse directions to said pitch changing gears, pitch change measuring means, means for transmitting motion in reverse directions relative to changes of blade pitch, air speed measuring means, a follow-up system for transmitting motion relative to changes of air speed, control means cooperatively associated with said motions and said reversible pitch changing means.

4. A power shaft, a hub secured to said shaft, spaced radial propeller blades rotatably mounted in said hub, pitch change gearing cooperating with said blades and said hub, a brake wheel loose on said shaft, spiral teeth on said wheel, said teeth cooperating with said gearing, brake operated reversing means cooperating with said brake wheel and said shaft, differential pitch change measuring means cooperating with said wheel and said reversing means, air speed measuring means, a follow up system for transmitting appreciable changes of air speed cooperating with said air speed measuring means, control means cooperating with said follow up system and said pitch change measuring means.

5. In combination, a power shaft, a fixed hub, spaced rotatable blades, change pitch gears, a brake wheel, reversing gear, electromagnetically operated brakes, spiral teeth on said wheel, and said reversing gear, a differential pitch indicating gear; an air vane, adjustable spring, flexible contactor, contact carrying drum, reducing gear, reversible motor, flexible shaft; sleeve and torsional springs, adjustable cams, economizer switches, switch plate, selective contactor, cutout switch, and adjustable stops cooperating with said switch plate.

CHANDLEY W. LAMBERT.